United States Patent
St. Jacques, Jr.

(10) Patent No.: US 9,912,824 B2
(45) Date of Patent: Mar. 6, 2018

(54) TRIGGERING WORKFLOWS FROM A MULTIFUNCTION DEVICE

(71) Applicant: XEROX CORPORATION, Norwalk, CT (US)

(72) Inventor: Robert J. St. Jacques, Jr., Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 278 days.

(21) Appl. No.: 14/176,363

(22) Filed: Feb. 10, 2014

(65) Prior Publication Data

US 2015/0229794 A1    Aug. 13, 2015

(51) Int. Cl.
| | | |
|---|---|---|
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |
| H04N 1/00 | (2006.01) | |

(52) U.S. Cl.
CPC ..... *H04N 1/00413* (2013.01); *H04N 1/00244* (2013.01); *H04N 1/00474* (2013.01); *H04N 1/00477* (2013.01); *H04N 1/00503* (2013.01); *H04N 2201/0094* (2013.01)

(58) Field of Classification Search
CPC . G06F 17/24; G06F 17/25; G06F 3/14; G06T 11/60; A63F 2300/5553; A63F 2300/6623; H04N 1/00501; H04N 1/00244; H04N 1/00413; H04N 1/00474; H04N 1/00477; H04N 1/00503; H04N 2201/0094
USPC .................................. 715/201, 202, 230, 255
See application file for complete search history.

(56) References Cited

U.S. PATENT DOCUMENTS

| | | |
|---|---|---|
| 6,795,081 B2 | 9/2004 | Lavelle et al. |
| 7,155,715 B1 | 12/2006 | Cui et al. |
| 7,631,291 B2 | 12/2009 | Shukla et al. |
| 7,657,831 B2 | 2/2010 | Donahue |

(Continued)

FOREIGN PATENT DOCUMENTS

WO    0125906    12/2001

*Primary Examiner* — Maryam Ipakchi
*Assistant Examiner* — Jenq-Kang Chu
(74) *Attorney, Agent, or Firm* — Gibb & Riley, LLC

(57) ABSTRACT

In response to user selection of a workflow from among workflow menu options presented on a graphic user interface of a multifunction device, methods and systems automatically and dynamically create device-specific user interface screens that are used in execution of the selected workflow. The device-specific user interface screens comply with unique formatting requirements of the graphic user interface of the multifunction device upon which they are displayed. The device-specific user interface screens provide data input instructions on the graphic user interface, to which the user responds, allowing these methods and systems to receive workflow data into the graphic user interface. These methods and systems transmit the workflow data from the multifunction device to a computerized device over a computerized network. Thus, these methods execute the workflow (through the computerized device and/or the multifunction device) using the workflow data.

14 Claims, 6 Drawing Sheets

(56) References Cited

U.S. PATENT DOCUMENTS

| | | |
|---|---|---|
| 7,747,958 B2 | 6/2010 | Luo et al. |
| 8,181,150 B2 | 5/2012 | Szpak et al. |
| 8,438,039 B2 | 5/2013 | Gottesman et al. |
| 2003/0069848 A1 | 4/2003 | Larson et al. |
| 2005/0200907 A1* | 9/2005 | Kitayama .............. G06Q 10/10 358/444 |
| 2006/0074734 A1* | 4/2006 | Shukla .................... G06F 8/10 717/107 |
| 2008/0127183 A1* | 5/2008 | Emerson ............... G06F 9/5038 718/100 |
| 2008/0178108 A1* | 7/2008 | Sodhi ..................... G06F 8/38 715/771 |
| 2009/0281862 A1* | 11/2009 | Conescu ............ G06Q 10/0633 705/7.27 |
| 2010/0082821 A1* | 4/2010 | Rosenblatt ............. G06F 15/16 709/228 |
| 2010/0185954 A1 | 7/2010 | Simernitski et al. |
| 2011/0205234 A1* | 8/2011 | Takaoka ............... G03G 15/502 345/522 |
| 2012/0331444 A1* | 12/2012 | Szpak ..................... G06F 8/10 717/105 |

* cited by examiner

TRIGGERING WORKFLOWS FROM A MULTIFUNCTION DEVICE

BACKGROUND

Systems and methods herein generally relate to workflows that operate through graphic user interfaces of multifunction devices (e.g., printing and scanning devices).

Often, computerized workflows are created by programmers to allow users to perform multiple functions with just a single instruction. For example, workflows can combine activities of scanners and printers. There are several ways to initiate workflows from a multifunction device (MFD) that may include a scanner and a printer. Many workflows may be included with the MFD and be accessible from the MFD user interface (e.g., workflow/network scanning). Additionally, many modern devices have the capability to extend/enhance the user interface by adding new capabilities; for example, some devices make it possible to add new services to the MFD user interface that appear as buttons/icons in the user interface, but in reality are web applications (sometimes referred to as "apps") hosted not on the device, but on a network accessible server. Typically, each service/workflow requires a custom built application that must be tailored to a specific workflow and device. Tools attempt to simplify the process of writing an app but do not address the one app per workflow problem.

SUMMARY

Exemplary methods herein create arbitrary workflows and maintain such workflows in a computerized server connected to a computerized network. These methods can name the arbitrary workflows to provide workflow names (using the computerized device). Further, these methods can register the workflows with one or more multifunction devices from which the arbitrary workflows may be executed (using the computerized device). Each multifunction device may be used to execute one or more of the arbitrary workflows. Each arbitrary workflow can be represented by a different icon (displaying the workflow name) on the graphical user interface of the multifunction device. The multifunction devices generally have at least a printing device and a scanning device.

Thus, these methods provide workflow menu options to graphic user interfaces of the multifunction devices (from the computerized device over the computerized network). The workflow menu options provide options to execute the arbitrary workflows, which may be identified by the workflow names. The workflows that have been registered with a specific multifunction device will be displayed on the graphical user interface of that multifunction device. A user selects one of the available workflows by providing input into the graphic user interface of the multifunction device (i.e., by physically pressing the icon that represents the workflow on the graphical user interface touch screen).

In response to the user selection that identifies a selected workflow from among the registered workflow options, the methods herein automatically and dynamically create (using the computerized device) device-specific user interface screens that function similarly to the existing dynamic web form, but with the appropriate look and feel for an MFD user interface to make better use of the MFD user interface screen real estate. The device-specific user interface screens are used in execution of the selected workflow, and the device-specific user interface screens comply with unique formatting requirements of the graphic user interface. Thus, the device-specific user interface screens have different formats for different multifunction devices, depending upon the requirement of the graphic user interface of the MFD. For example, one MFD with a relatively large screen may be able to display 6 different workflow input fields on each screen (e.g., "Username," "Password," "Filename," etc.) while another MFD with a smaller screen may only be able to display 3 fields on each screen (thus requiring twice as many user interface screens to collect the same workflow input from a user). The computerized device generates different user interface screens dynamically for the different MFDs that collect input and execute the same arbitrary workflow, using "Next" and "Previous" buttons to allow the user to navigate from one user interface screen to another.

These methods supply the device-specific user interface screens from the computerized device to the graphic user interface. The device-specific user interface screens provide data input fields on the graphic user interface, into which the user may provide input, allowing these methods to receive workflow input from the graphic user interface in response to the user input. The user may also use the device-specific user interface screens to flag specific fields as "scan input" (on the graphic user interface, e.g., by ticking a checkbox next to the specific input fields) indicating that the specific input will be provided as scanned data using the scanning device. Once the user has entered all of the required input for the selected workflow, the dynamic user interface prompts the user to scan once for each of the input fields that the user indicated would be provided as scanned input. These methods create scanned files from scans of the items scanned using the multifunction device according to the selected workflow and transmit the workflow input data entered into the graphical user interface as well as the scanned files from the multifunction device to the computerized device over the computerized network. Thus, these methods execute the workflow (through the computerized device and/or the multifunction device) using the workflow data and the scanned files (which can include printing items using the printing device).

Exemplary computerized systems herein comprise a computerized device (such as a computerized server) and a plurality of multifunction devices operatively connected to one another through a computerized network. The multifunction devices generally include at least a graphic user interface, a printing device, and a scanning device.

The multifunction devices register generic workflows to produce a listing of generic workflows registered with the multifunction devices. The computerized server can maintain (e.g., store) the generic workflows, which may be named. The computerized device provides workflow menu options to the graphic user interface of the multifunction device over the computerized network. Each multifunction device may be used to execute one or more of the arbitrary workflows. Each arbitrary workflow can be represented by a different icon (displaying the workflow name) on the graphical user interface of the multifunction device.

The workflow menu options include options to execute such generic workflows. The computerized device automatically and dynamically creates device-specific user interface screens that function similarly to the existing dynamic web form, but with the appropriate look and feel for an MFD user interface to make better use of the MFD user interface screen real estate, in response to a selection from among the workflow menu options input to the graphic user interface (where the selection identifies the selected workflow). The device-specific user interface screens comply with unique formatting requirements of the graphic user interface, and the device-specific user interface screens are used in execution of the selected workflow. The device-specific user interface screens have different formats for different multi-function devices, depending upon the requirement of the graphic user interface of the MFD.

The computerized device supplies, to the MFD graphic user interface, the device-specific user interface screens. The device-specific user interface screens provide data input instructions on the graphic user interface, and workflow data is received into the graphic user interface in response to the data input instructions. The device-specific user interface screens can also provide scanning instructions to scan items using the scanning device on the graphic user interface. The multifunction device creates scanned files from scans of the items scanned according to the selected workflow. The multifunction device transmits the workflow data and the scanned files to the computerized device over the computerized network, and the computerized device executes the workflow using the workflow data and the scanned files (which can comprise the printing device printing items generated from the workflow data and/or the scanned data).

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
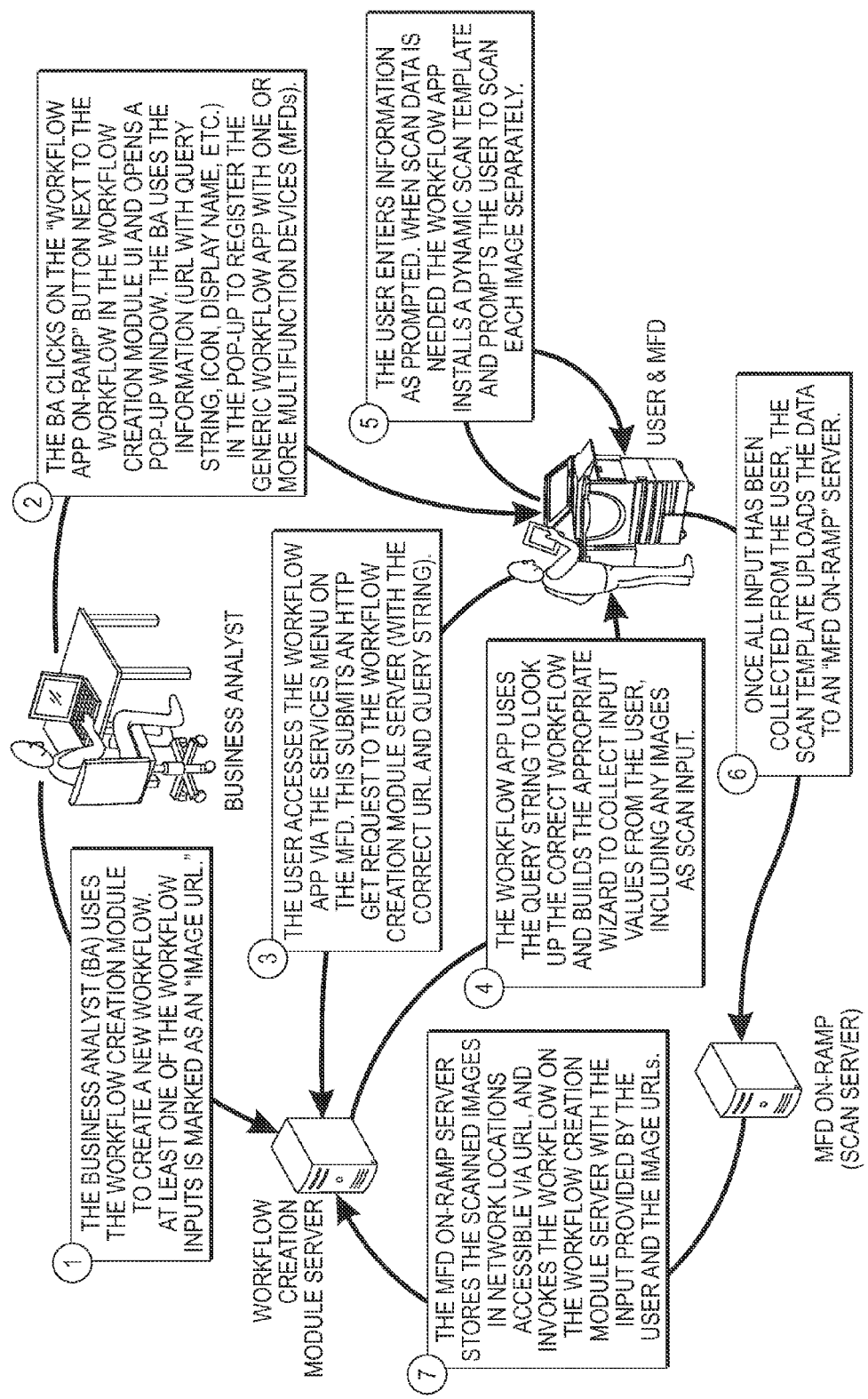
FIG. 1 is a flow diagram of various methods herein.

As mentioned above, many modern devices have the capability to extend/enhance the user interface by adding new capabilities. The systems and methods herein provide a generic "web application" to dynamically generate a user interface for a specific workflow with minimal information about the workflow (i.e., a workflow ID provided as part of a query string). The systems and methods herein collect user input for the workflow, including scan data from the MFD itself, before executing the workflow in a generic way. Thus, the same web application is reusable to initiate any workflow without code modification.

Workflow creation modules allow business analysts (BA) with limited knowledge to create arbitrary workflows by chaining web services together using a simple graphical user interface. Once the simple workflow has been designed, the workflow creation module determines all of the inputs and outputs for the services in the workflow and prompts the business analysts with a simple wizard interface that allows the business analysts to specify the source of the input by choosing, for example, one of the following options:

1.) Binding an output value from a previous service to a specific input value;

2.) Binding the input to a value specified by the user at execution time; and

3.) Binding the input to a pre-determined "hard coded" value.

The workflow creation module then generates a dynamic web form that allows the user to specify any needed input values and to execute an instance of the workflow. This allows the user to navigate to the workflow creation module portal and choose the specific workflow to execute from a list of workflows currently deployed. Alternatively, the business analysts may generate a "web hook" that can be embedded into an arbitrary web site. This "web hook" can be in the form of hypertext markup language (HTML) or JavaScript® (Java® and corresponding items are available from Oracle Corp., Redwood City, Calif., USA) code that can be copied and pasted into the source code for a web page so that the specific workflow can be executed directly from that page. This allows the workflow to be executed without requiring the user to explicitly navigate to the workflow creation module portal. With such solutions, when scan data (e.g. forms) are input, the user first scans the images, saves the images to a network location accessible as a uniform resource locator (URL), and then specifies that URL(s) as input to the workflow (e.g. by cutting/pasting the URL into one of the web forms, or typing the URL manually).

The systems and methods herein create dynamic forms that accept workflow inputs from a user. The systems and methods herein use a workflow ID to read information about a specific workflow from a database and dynamically build a web interface based on the required inputs. Due to the constraints on the screen size of an MFD, workflows with many input values (e.g. more than 3-4) are split across several screens using a "wizard-like" interface to collect the necessary inputs from the user.

Also, as shown in item 1 in FIG. 1, some input values are flagged by the business analysts as "IMAGE URLS" (or flagged by the user at execution time). This indicates to the workflow application that these input values could or should be collected as scan input. The workflow application prompts the user to scan each "IMAGE URL" value separately so that the specific scan input can be associated with the specific scanned images (item 5, in FIG. 1). The workflow application accomplishes this by installing dynamic (i.e., "one time use") scan templates on the MFD at execution time.

Once all of the input data has been collected (i.e., data entered into forms at the MFD user interface as well as any scanned images), the corresponding generic workflow is executed with the input. This can be done in many ways. For example, the scanned data can be uploaded to a network location accessible via URL, and the URLs pointing to these data are submitted along with the rest of the input to the workflow creation module using a hypertext transfer protocol (HTTP) POST from the MFD via the workflow application. Also, the scanned data can be routed through an "MFD On-Ramp" (as shown by item 6 in FIG. 1). All of the input values entered by the user are uploaded as part of a template. The MFD On-Ramp stores the images in network locations accessible via URL and invokes the correct workflow on the workflow creation module (see item 7 in FIG. 1) using the URLs as input values.

FIG. 1 illustrates one possible implementation of the systems and methods herein that makes used of dynamic scan templates, and a workflow creation module (a code-free platform for designing, deploying, and executing arbitrary workflows). As shown in item 1 in FIG. 1, the business analysts uses the workflow creation module to create a new workflow. This involves selecting services, chaining them together into a sequence, and using a "wizard" to bind the inputs of each service in one of three ways (described above). At this time the business analysts may also flag certain inputs as "IMAGE URLS," indicating that they may be supplied at execution times in the form of scanned image data.

As shown in item 2 in FIG. 1, once the workflow is created and deployed, the workflow creation module assigns a unique workflow ID (e.g. "1234"). The business analysts then clicks on the "MFD On-Ramp" button for the new workflow, which opens a pop-up window containing the details necessary to register the generic workflow application with a capable MFD. This includes the icon(s) to be displayed on the MFD user interface, the display name that should be used in the MFD user interface (e.g. "Workflow 1234"), and the URL to access the workflow application for the specific workflow ID, e.g. "https://www.example.com/workflowapplication?1234." The business analyst uses this information to register the workflow application with one or more MFDs.

As shown in item 3 in FIG. 1, at execution time, a user walks up to an MFD and sees the a button representing "Workflow 1234." The user presses the button, which causes the MFD to submit an HTTP GET request to the URL used at registration time, e.g. http://www.example.com/workflowapplication?1234. Note that the workflow ID is specified as a query string at the end of the URL.

Figure 2:
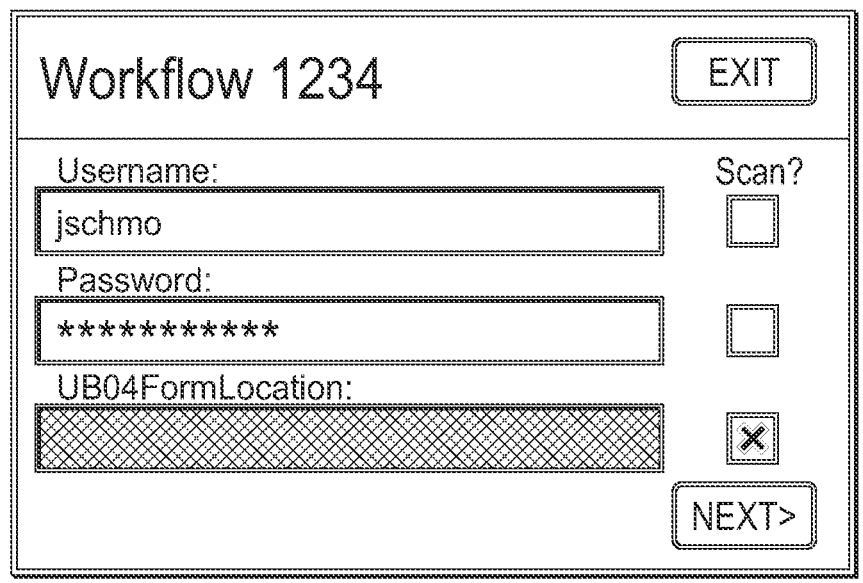
FIG. 2 is a user interface screen utilized by various methods and systems herein.
Figure 3:
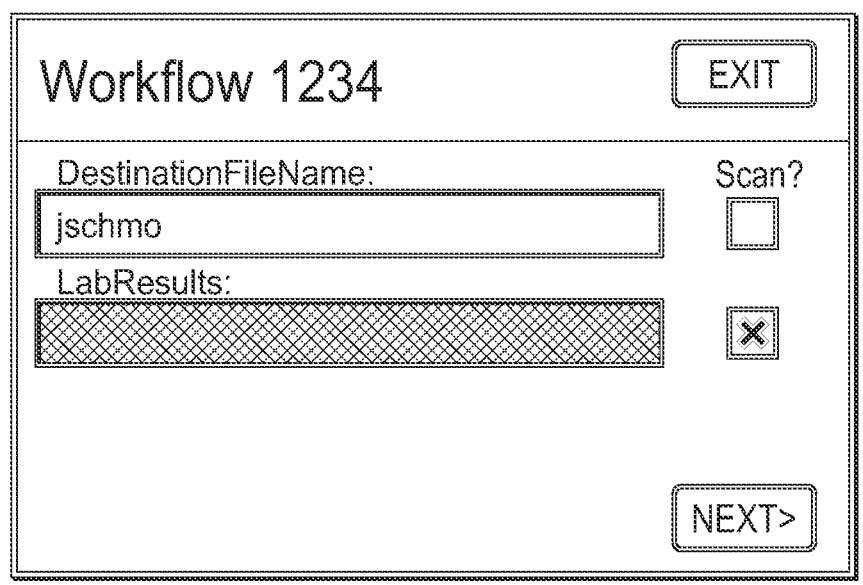
FIG. 3 is a user interface screen utilized by various methods and systems herein.
Figure 4:
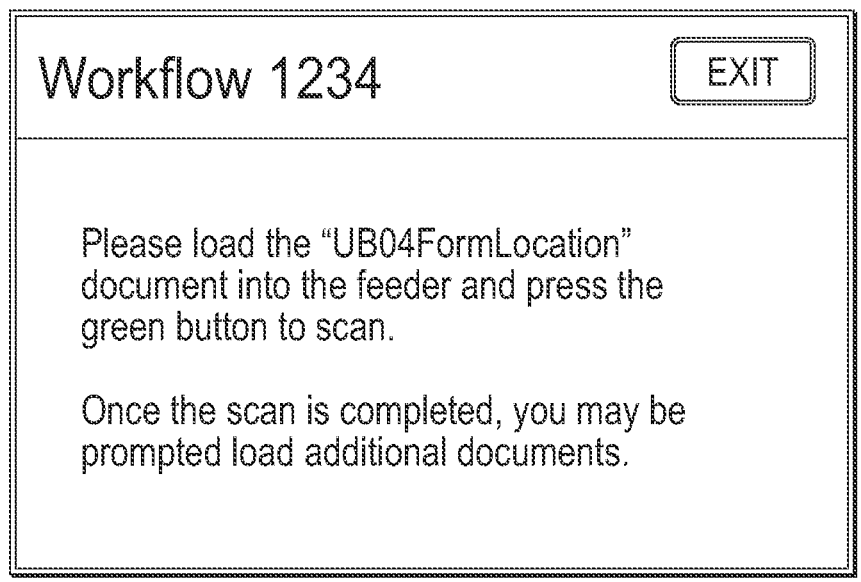
FIG. 4 is a user interface screen utilized by various methods and systems herein.

As shown in item 4 in FIG. 1, the workflow application uses the query string to look up the specific workflow and determine which service inputs have been flagged by the business analysts as user-specified values and/or "IMAGE URLS." The workflow application dynamically builds one or more web pages to be displayed on the MFD in a "wizard" style, each prompting the user for 3-4 workflow input values (see FIG. 2-4).

As shown in item 5 in FIG. 1, the user navigates through the dynamic "wizard," providing input values for the workflow, pressing a "next button" to move to subsequent screens (see FIGS. 2 and 3). Once the user has entered all of the required values, the workflow application will then prompt for each "scan data" input one at a time; a screen is displayed asking the user to load each required document and press the green button to scan (see FIG. 4).

Note, that at this point, it is also possible that the user might flag certain input values as "scan data" as well (rather than having the business analysts do it when the workflow is created). In this case, the workflow application notes which inputs are scan data, and prompts the user to scan at the end (in much the same way as if the business analysts had flagged the inputs at an earlier stage).

The user may thus use the device-specific user interface screens to flag specific fields as "scan input" (on the graphic user interface, e.g. by ticking a checkbox next to the specific input fields) indicating that the specific input will be provided as scanned data using the scanning device. Once the user has entered all of the required input for the selected workflow, the dynamic user interface prompts the user to scan once for each of the input fields that the user indicated would be provided as scanned input.

As shown in item 6 in FIG. 1, once all input has been collected, the scan data and template data (including the form data entered into the workflow application) are uploaded to the "MFD On-Ramp," a specialized scan server capable of receiving workflow input data, and stored in a network location accessible via URL, and the specified workflow is invoked. Note that the MFD On-Ramp server may be physically co-located with the workflow creation module server.

As shown in item 7 in FIG. 1, the MFD On-Ramp stores the scan data in network locations accessible via URL (e.g. a web server), and then uses the form data in the scan template (including the workflow ID) to invoke the specified workflow with the user-provided input values. From this point forward execution of the workflow is the same as it would have been if the user had executed the workflow manually from the web form and had manually specified the IMAGE URLs directly by typing them into the input fields (e.g. "http://www.example.com/images/myForm.pdf").

More specifically, FIG. 2 illustrates an exemplary screen created to execute a simple scan-to-* workflow. In this example the user has checked a box next to the 'UB04FormLocation' input field indicating that they will provide this data as a scan. Note this value could also be flagged as scan data by the Business Analyst at the time that the workflow is deployed (as described above).

FIG. 3 illustrates another exemplary screen showing that the workflow application breaks the input fields up according to the screen real estate available on the MFD user interface, displaying only 3 fields per screen. The user navigates from one screen to the next by pressing the "NEXT>" button.

As shown in FIG. 4, once the user has entered all input values, the user is prompted to scan each of the values that the user flagged as "Scan." A dynamic scan template will be used to upload the scan data to the MFD On-Ramp, where it will be stored in a location accessible by URL. This URL will in turn be specified as the appropriate input value when the workflow is executed.

These systems and methods dramatically simplify and strengthen the connection between multifunction devices and the workflow creation module in many ways. For example, the workflow creation module allows the business analysts to design and deploy arbitrary workflows without requiring that a single line of code be written. However, in order to bridge the gap between MFDs and the workflow creation module, some systems require that an application developer create a custom application for each workflow. The existing mechanisms for executing arbitrary workflows (i.e., the web form or the embedded "web hook") do not always display or function properly on an MFD user interface. The systems and methods herein instead provide a single, generic, reusable application capable of building a dynamic user interface for any workflow, with the appropriate look and feel for an MFD user interface. This application functions similarly to the existing dynamic web form, but features the appropriate look and feel for an MFD user interface, and makes better use of the screen real estate.

For example, one MFD with a relatively large screen may be able to display 6 different workflow input fields on each screen (e.g. "Username," "Password," "Filename," etc.) while another MFD with a smaller screen may only be able to display 3 fields on each screen (thus requiring twice as many user interface screens to collect the same workflow input from a user). The computerized device generates different user interface screens dynamically for the different MFDs that collect input and execute the same arbitrary workflow, using "Next" and "Previous" buttons to allow the user to navigate from one user interface screen to another.

It is difficult to provide a convenient way for users to provide image data required as input for a workflow, especially hard copy documents. In fact, the user may have to first scan documents, store them in a location accessible via URL, and then manually type the URL into an input field. The systems and methods herein leverage dynamic scan templates to upload scanned images to an MFD On-Ramp server, which in turn stores the images in a location accessible via URL. The URLs then are mapped to the correct inputs automatically when the workflow is executed, eliminating the manual and error-prone process used with other systems.

Ultimately, the systems and methods herein provide a mechanism for the Business Analyst or the service consumer (e.g., the end user) to access and execute arbitrary workflows from an MFD and to provide scan data as input without having to write a single line of code or even design the app using a tool. This "out of the box" functionality provides a major enhancement to the usability of the workflow creation module system as well as the connectivity between MFDs and the workflow creation module.

Figure 5:
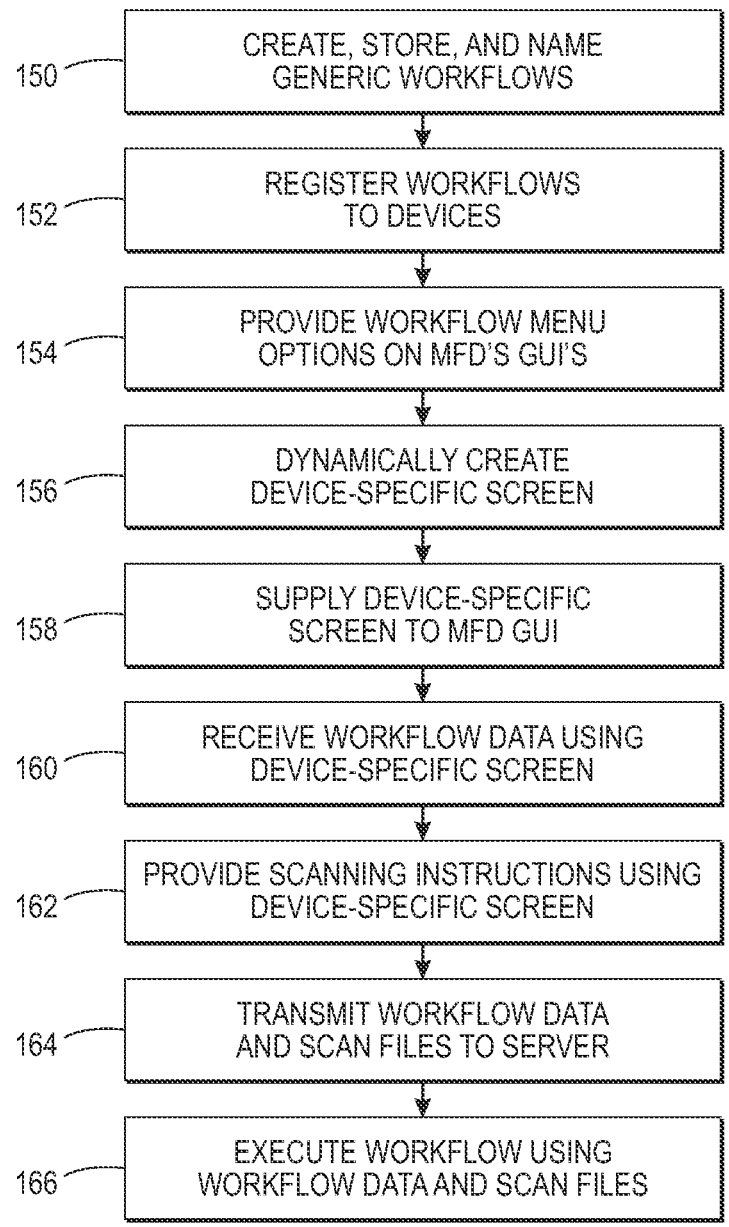
FIG. 5 is a flow diagram of various methods herein.

FIG. 5 is flowchart illustrating exemplary methods herein. In item 150, these methods create arbitrary workflows (sometimes referred to herein as generic workflows) and maintain such generic workflows in a computerized server connected to a computerized network. In item 150, these methods can name the generic workflows to provide workflow names (using the computerized device). Further, in item 152, these methods can register multifunction devices from which the generic workflows may operate (using the computerized device) to produce a listing of multifunction devices registered with the generic workflows. The multifunction devices generally have at least a printing device and a scanning device. Each multifunction device may be used to execute one or more of the arbitrary workflows. Each arbitrary workflow can be represented by a different icon (displaying the workflow name) on the graphical user interface of the multifunction device Thus, as shown in item 154, these methods provide workflow menu options to graphic user interfaces of the multifunction devices (from the computerized device over the computerized network). The workflow menu options provide user choices to execute the generic workflows, which may be identified by workflow names. The workflow menu options may be limited (by the computerized device) to only the arbitrary workflows registered with said multifunction devices. A user selects one of the options by providing input into the graphic user interface of the multifunction device (e.g., by physically pressing the icon that represents the workflow on the graphical user interface touch screen).

In response to the user selection that identifies a selected workflow from among the workflow menu options provided in item 154, the methods herein automatically and dynamically create (using the computerized device) device-specific user interface screens or screenshots (FIGS. 2-4) that function similarly to the existing dynamic web form, but with the appropriate look and feel for an MFD user interface to make better use of the MFD user interface screen real estate in item 156. The device-specific user interface screens are used in execution of the selected workflow, and the device-specific user interface screens comply with unique formatting requirements of the graphic user interface. Thus, the device-specific user interface screens have different formats for different multifunction devices.

These methods supply the device-specific user interface screens from the computerized device to the MFD's graphic user interface in item 158. The device-specific user interface screens provide data input instructions on the graphic user interface, to which the user responds, allowing these methods to receive workflow data into the graphic user interface in response to the data input instructions (in item 160). The device-specific user interface screens can also provide scanning instructions (on the graphic user interface) to scan items using the scanning device in item 162. These methods create scanned files from scans of the items scanned using the multifunction device according to the selected workflow and transmit the workflow data and the scanned files from the multifunction device to the computerized device (e.g., the server) over the computerized network in item 164. Thus, these methods execute the workflow (through the computerized device and/or the multifunction device) using the workflow data and the scanned files (which can include printing items using the printing device) in item 166.

Figure 6:
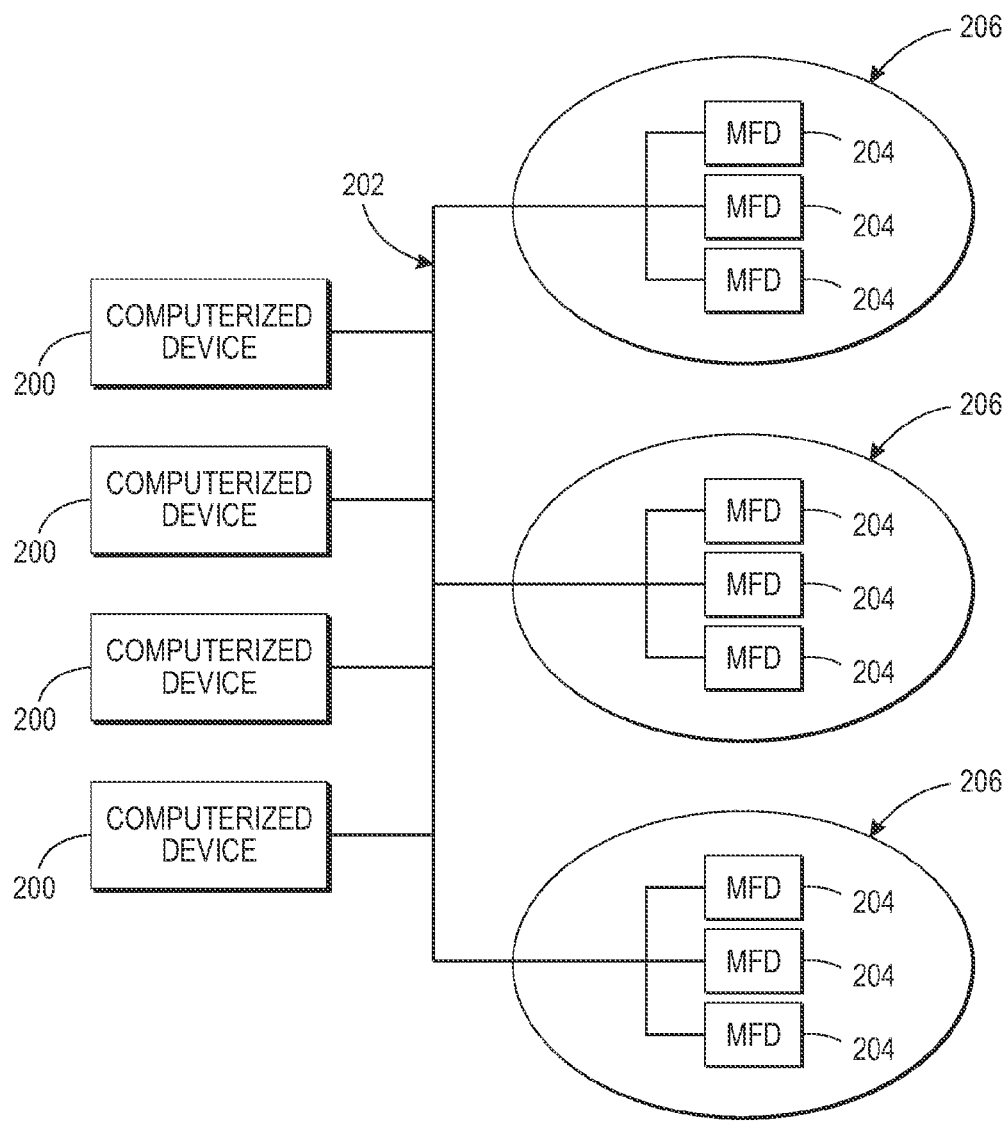
FIG. 6 is a schematic diagram illustrating systems herein.

As shown in FIG. 6, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
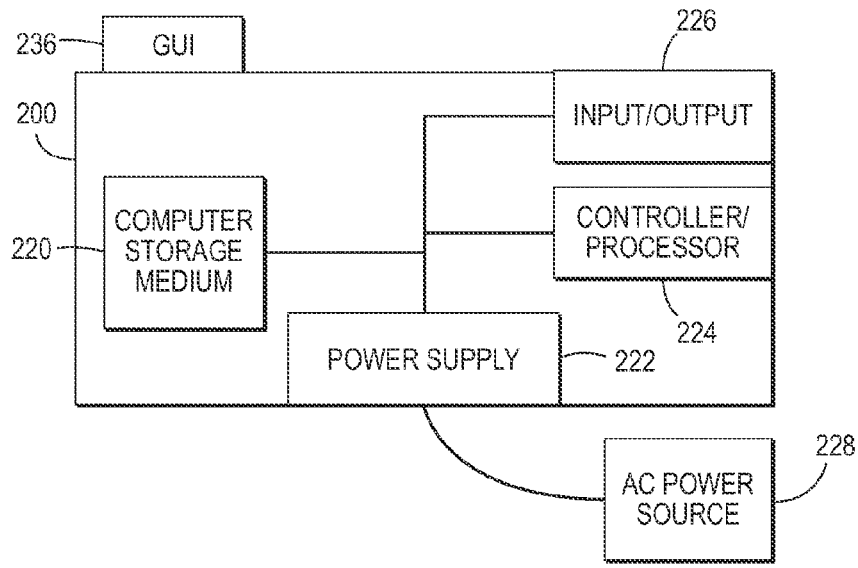
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236, that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 7, a body housing has one or more functional components that operate on power supplied from an alternating current (AC) source 228 by the power supply 222. The power supply 222 can comprise a power storage element (e.g., a battery, etc).

Figure 8:
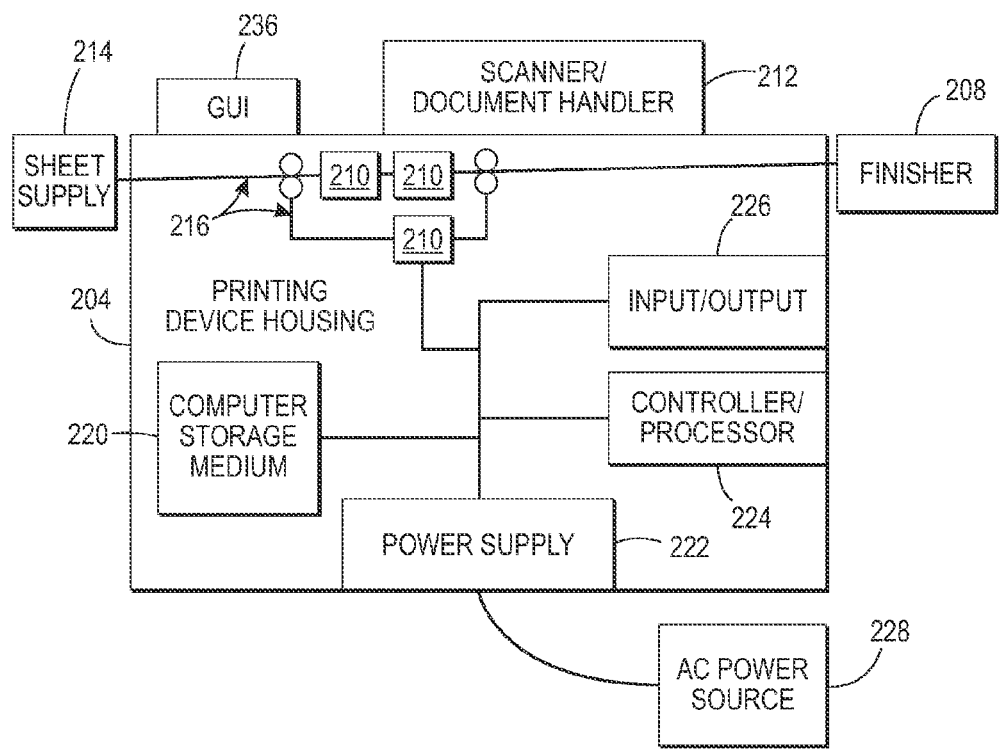
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, as shown above, exemplary computerized systems herein comprise a computerized device 200 (such as computerized server) and a plurality of multifunction devices 204 operatively connected to one another through a computerized network 202. The multifunction devices 204 generally include at least a graphic user interface 236, a printing device 210, and a scanning device 212.

The multifunction devices 204 register generic workflows to produce a listing of generic workflows registered with the multifunction devices 204. The workflow menu options may be provided only by the generic workflows registered with said multifunction devices 204. The computerized server can maintain (store) the generic workflows, which may be named. The computerized device 200 provides workflow menu options to the graphic user interface 236 of the multifunction device over the computerized network 202.

The workflow menu options include options to execute generic workflows. The computerized device 200 automatically and dynamically creates device-specific user interface screens (FIGS. 2-4) that function similarly to the existing dynamic web form, but with the appropriate look and feel for an MFD 204 user interface 236 to make better use of the MFD 204 user interface 236 screen real estate, in response to a selection from among the workflow menu options input to the graphic user interface 236 (where the selection identifies a selected workflow). The device-specific user interface screens comply with unique formatting requirements of the graphic user interface 236, and the device-specific user interface screens are used in execution of the selected workflow. The device-specific user interface screens have different formats for different multifunction devices 204.

The computerized device 200 supplies, to the MFD 204 graphic user interface 236, the device-specific user interface screens. The device-specific user interface screens provide data input instructions on the graphic user interface 236, and workflow data is received into the graphic user interface 236 in response to the data input instructions. The device-specific user interface screens can also provide scanning instructions to scan items using the scanning device 212 on the graphic user interface 236. The multifunction device creates scanned files from scans of the items scanned according to the selected workflow. The multifunction device transmits the workflow data and the scanned files to the computerized device 200 over the computerized network 202, and the computerized device 200 executes the workflow using the workflow data and the scanned files (which can comprise the printing device 210 printing items generated from the workflow data and/or the scanned data).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (Guser interface), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving generic workflows created using a computerized device, each of said generic workflows having a workflow name;
   registering each of said generic workflows with different ones of multifunction devices that are adapted to execute said generic workflow and, for each of said multifunction devices, producing listings of registered workflows executable by said multifunction devices;
   providing, by said computerized device to said multifunction devices over a computerized network, said listings of said registered workflows executable by said multifunction devices, each of said multifunction devices comprising a printing device and a scanning device;
   displaying, via a graphic user interface of a multifunction device of said multifunction devices, workflow menu option icons, one for each of said generic workflows in said listings of registered workflows for said multifunction device;
   receiving a selection of one of said workflow menu option icons displayed on said graphic user interface of said multifunction device, said selection identifying a selected workflow of said generic workflows in said listings of registered workflows of said multifunction device;
   determining, by said computerized device, unique size formatting requirements of said graphic user interface of said multifunction device;
   automatically and dynamically creating, using said computerized device, device-specific user interface workflow screens corresponding to said selected workflow that comply with said unique size formatting requirements of said graphic user interface of said multifunction device in response to said selection from among said workflow menu option icons by splitting data input fields of said selected workflow across multiple input screens differently for different ones of said multifunction devices, based on said unique size formatting requirements of said different ones of said multifunction devices, to collect workflow data through said multifunction device, said workflow data including input values flagged as to be provided through multiple input scans from said scanning device of said multifunction device, such that said different ones of said multifunction devices with different screen sizes display the same data input fields of said selected workflow split differently among different input screens that include a "next" button to move to subsequent ones of said different input screens until all said different input screens for said multifunction device have been displayed, to collect the same workflow data for said selected workflow irrespective of different screen sizes of the different multifunction devices, and such that all of said input scans are presented in a last input screen presented on said graphic user interface at the end of said subsequent ones of said different input screens to have all scanning occur at the end of collection of said same workflow data;

supplying said device-specific user interface workflow screens from said computerized device to said graphic user interface;

displaying said data input fields on said graphic user interface using said device-specific user interface workflow screens by displaying, for each of said workflow data including said input scans on said last input screen for a user, a prompt for prompting said user to perform said input scans and individually scan each of said workflow data flagged;

receiving said workflow data via said graphic user interface in response to said data input fields;

transmitting said workflow data from said multifunction device to said computerized device over said computerized network; and executing, by said computerized device, said selected workflow using said workflow data.

2. The method according to claim 1, said executing said selected workflow comprising printing using said printing device.

3. The method according to claim 1, said providing said workflow menu option icons being provided only by said registered workflows.

4. The method according to claim 1, further comprising maintaining said generic workflows in a computerized server connected to said computerized network.

5. The method according to claim 1, further comprising naming said generic workflows to provide workflow names using said computerized device, said workflow menu option icons identifying said generic workflows using said workflow names.

6. A method comprising:

receiving generic workflows created using a computerized device, each of said generic workflows having a workflow name;

registering each of said generic workflows with different ones of multifunction devices that are adapted to execute said generic workflow and, for each of said multifunction devices, producing listings of registered workflows executable by said multifunction devices;

providing, by said computerized device to said multifunction devices over a computerized network, said listings of said registered workflows executable by said multifunction devices, each of said multifunction devices comprising a printing device and a scanning device;

displaying, via a graphic user interface of a multifunction device of said multifunction devices, workflow menu option icons, one for each of said generic workflows in said listings of registered workflows for said multifunction device;

receiving a selection of one of said workflow menu option icons displayed on said graphic user interface of said multifunction device, said selection identifying a selected workflow of said generic workflows in said listings of registered workflows of said multifunction device;

determining, by said computerized device, unique size formatting requirements of said graphic user interface of said multifunction device;

automatically and dynamically creating, using said computerized device, device-specific user interface workflow screens corresponding to said selected workflow that comply with said unique size formatting requirements of said graphic user interface of said multifunction device in response to said selection from among said workflow menu option icons by splitting data input fields of said selected workflow across multiple input screens differently for different ones of said multifunction devices, based on said unique size formatting requirements of said different ones of said multifunction devices, to collect workflow data through said multifunction device, said workflow data including input values flagged as to be provided through multiple input scans from said scanning device of said multifunction device, such that said different ones of said multifunction devices with different screen sizes display the same data input fields of said selected workflow split differently among different input screens that include a "next" button to move to subsequent ones of said different input screens until all said different input screens for said one of multifunction devices have been displayed, to collect the same workflow data for said selected workflow irrespective of different screen sizes of the different multifunction devices, and such that all of said input scans are presented in a last input screen presented on said graphic user interface at the end of said subsequent ones of said different input screens to have all scanning occur at the end of collection of said same workflow data;

supplying said device-specific user interface workflow screens from said computerized device to said graphic user interface;

displaying said data input fields on said graphic user interface using said device-specific user interface workflow screens by displaying, for each of said workflow data including said input scans on said last input screen for a user, a prompt for prompting said user to perform said input scans and individually scan each of said workflow data flagged;

receiving said workflow data via said graphic user interface in response to said data input fields;

creating scanned files from scans of said items scanned using said multifunction device according to said selected workflow to produce said workflow data;

transmitting said workflow data and said scanned files from said multifunction device to said computerized device over said computerized network; and executing, by said computerized device, said selected workflow using said workflow data and said scanned files.

7. The method according to claim 6, said executing said selected workflow comprising printing using said printing device.

8. The method according to claim 6, said providing said workflow menu option icons being provided only by said registered workflows.

9. The method according to claim 6, further comprising maintaining said generic workflows in a computerized server connected to said computerized network.

10. The method according to claim 6, further comprising naming said generic workflows to provide workflow names using said computerized device, said workflow menu option icons identifying said generic workflows using said workflow names.

11. A computerized system comprising:
a computerized device;
a computerized network operatively connected to said computerized device; and
a plurality of multifunction devices operatively connected to said computerized device through said computerized network,
a multifunction device of said multifunction devices comprising a graphic user interface, a printing device, and a scanning device,
said computerized device creating generic workflows, each of said generic workflows having a workflow name,
said computerized device registering each of said generic workflows with different ones of multifunction devices that are adapted to execute said generic workflow and, for each of said multifunction devices, producing listings of registered workflows executable by said multifunction devices,
said computerized device providing to said multifunction devices over said computerized network, said listings of said registered workflows executable by said multifunction devices,
said graphic user interface displaying, workflow menu option icons, one for each of said generic workflows in said listings of registered workflows for said multifunction device,
said multifunction device receiving a selection of one of said workflow menu option icons displayed on said graphic user interface of said multifunction device, said selection identifying a selected workflow of said generic workflows in said listings of registered workflows of said multifunction device,
said computerized device determining unique size formatting requirements of said graphic user interface of said multifunction device,
said computerized device automatically and dynamically creating device-specific user interface workflow screens corresponding to said selected workflow that comply with said unique size formatting requirements of said graphic user interface of said multifunction device in response to said selection from among said workflow menu option icons by splitting data input fields of said selected workflow across multiple input screens differently for different ones of said multifunction devices, based on said unique size formatting requirements of said different ones of said multifunction devices, to collect workflow data through said multifunction device, said workflow data including input values flagged as to be provided through multiple input scans from said scanning device of said multifunction device, such that said different ones of said multifunction devices with different screen sizes display the same data input fields of said selected workflow split differently among different input screens that include a "next" button to move to subsequent ones of said different input screens until all said different input screens for said multifunction device have been displayed, to collect the same workflow data for said selected workflow irrespective of different screen sizes of the different multifunction devices, and such that all of said input scans are presented in a last input screen presented on said graphic user interface at the end of said subsequent ones of said different input screens to have all scanning occur at the end of collection of said same workflow data, said computerized device supplying said device-specific user interface workflow screens to said graphic user interface, said device-specific user interface workflow screens displaying said data input fields on said graphic user interface by displaying, for each of said workflow data including said input scans on said last input screen for a user, a prompt for prompting said user to perform said input scans and individually scan each of said workflow data flagged, said workflow data being receiving via said graphic user interface in response to said data input fields, said multifunction device creating scanned files from scans of said items scanned according to said selected workflow, said multifunction device transmitting said workflow data and said scanned files to said computerized device over said computerized network, and said computerized device executing said selected workflow using said workflow data and said scanned files.

12. The computerized system according to claim 11, said executing said selected workflow comprising said printing device printing.

13. The computerized system according to claim 11, further comprising a computerized server connected to said computerized network, said computerized server maintaining said generic workflows.

14. The computerized system according to claim 11, said computerized device naming said generic workflows to provide workflow names, said workflow menu option icons identifying said generic workflows using said workflow names.

* * * * *